US010361446B2

(12) United States Patent
Kurungot et al.

(10) Patent No.: US 10,361,446 B2
(45) Date of Patent: Jul. 23, 2019

(54) PROCESS FOR THE PREPARATION OF PBI BASED MEMBRANE ELECTRODE ASSEMBLY (MEA) WITH IMPROVED FUEL CELL PERFORMANCE AND STABILITY

(71) Applicant: COUNCIL OF SCIENTIFIC & INDUSTRIAL RESEARCH, New Delhi (IN)

(72) Inventors: Sreekumar Kurungot, Pune (IN); Rajith Illathvalappil, Pune (IN); Siddheshwar Navanath Bhange, Pune (IN); Sreekuttan Maraveedu Unni, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 175 days.

(21) Appl. No.: 15/102,625

(22) PCT Filed: Dec. 9, 2014

(86) PCT No.: PCT/IN2014/000764
§ 371 (c)(1),
(2) Date: Jun. 8, 2016

(87) PCT Pub. No.: WO2015/087348
PCT Pub. Date: Jun. 18, 2015

(65) Prior Publication Data
US 2016/0315343 A1 Oct. 27, 2016

(30) Foreign Application Priority Data
Dec. 9, 2013 (IN) .......................... 3569/DEL/2013

(51) Int. Cl.
*H01M 8/1004* (2016.01)
*H01M 8/103* (2016.01)
(Continued)

(52) U.S. Cl.
CPC ......... *H01M 8/1004* (2013.01); *H01M 4/926* (2013.01); *H01M 8/103* (2013.01);
(Continued)

(58) Field of Classification Search
None
See application file for complete search history.

(56) References Cited

U.S. PATENT DOCUMENTS 6,946,211 B1  9/2005 Bjernum et al.
7,947,410 B2  5/2011 Liu et al.
(Continued)

OTHER PUBLICATIONS

F. Seland, et al., "Improving the performance of high-temperature PEM fuel cells based on PBI electrolyte," Journal of Power Sources, 160 (2006) 27-36.
(Continued)

*Primary Examiner* — Carmen V Lyles-Irving
(74) *Attorney, Agent, or Firm* — Abelman, Frayne & Schwab

(57) ABSTRACT

The present invention discloses a process for the preparation of poly-benzimidazole (PBI) based membrane electrode assembly (MEA) with improved fuel cell performance and stability. It discloses a simple strategy to overcome the leaching of phosphoric acid (PA) from the membrane during fuel cell operation by an in-situ Current-Voltage (I-V) assisted doping of membrane with PA. The invention provides an improved method for the preparation of membrane electrode assembly (MEA) wherein said MEA possess high stability and improved fuel cell performance achieved by overcoming the leaching of phosphoric acid during cell operation.

2 Claims, 9 Drawing Sheets

(51) Int. Cl.
  *H01M 8/1048* (2016.01)
  *H01M 8/1051* (2016.01)
  *H01M 8/1213* (2016.01)
  *H01M 8/1253* (2016.01)
  *H01M 4/92* (2006.01)
  *H01M 8/1018* (2016.01)

(52) U.S. Cl.
  CPC ....... *H01M 8/1048* (2013.01); *H01M 8/1051* (2013.01); *H01M 8/1213* (2013.01); *H01M 8/1253* (2013.01); *H01M 2008/1095* (2013.01); *H01M 2300/0082* (2013.01); *Y02E 60/525* (2013.01); *Y02P 70/56* (2015.11)

(56) References Cited

U.S. PATENT DOCUMENTS

| 8,039,414 | B2 | 10/2011 | Hong et al. |
| 2006/0014068 | A1* | 1/2006 | Boysen ................. B82Y 30/00 |
| | | | 429/535 |
| 2006/0105226 | A1 | 5/2006 | Kim et al. |
| 2007/0166592 | A1* | 7/2007 | Cho ........................ C08J 5/2231 |
| | | | 429/493 |
| 2008/0050633 | A1 | 2/2008 | Kwon et al. |
| 2011/0091788 | A1 | 4/2011 | Ziser et al. |

OTHER PUBLICATIONS

Ronghuan He, et al., "Proton conductivity of phosphoric acid doped polybenzimidazole and its composites with inorganic proton conductors," Journal of Membrane Science, 226 (2003) 169-184.

Qingfeng Li, et al., "Water uptake and acid doping of polybenzimidazoles as electrolye membranes for fuel cells," Solid State Ionics, 168 (2004) 177-185.

International Search Report for PCT/IN2014/000764 dated Mar. 11, 2013 (2 pages).

Justo Lobato et al., "Study of the influence of the amount of PBI-H3PO4 in the catalytic layer of a high temperature PEMFC," International Journal of Hydrogen Energy, Elsevier Science Publishers, vol. 35, No. 3, pp. 1347-1355 (Feb. 1, 2010).

* cited by examiner

PROCESS FOR THE PREPARATION OF PBI BASED MEMBRANE ELECTRODE ASSEMBLY (MEA) WITH IMPROVED FUEL CELL PERFORMANCE AND STABILITY

RELATED APPLICATIONS

This application claims priority of PCT application PCT/IN2014/000764 filed Dec. 9, 2014 and Indian patent application 3569/DEL/2013 filed on Dec. 9, 2013, both of which are incorporated by reference in their entirety.

FIELD OF THE INVENTION

The present invention relates to a process for the preparation of PBI based membrane electrode assembly (MEA) with improved fuel cell performance and stability. Particularly, the present invention relates to a simple strategy to overcome the leaching of phosphoric acid (PA) from the membrane during fuel cell operation by an in-situ Current-Voltage (I-V) assisted doping of membrane with PA. More particularly, the invention provides an improved method for the preparation of MEA) wherein said MEA possess high stability and improved fuel cell performance achieved by overcoming the leaching of phosphoric acid during cell operation.

BACKGROUND AND PRIOR ART

Currently, High Temperature Polymer Electrolyte Membrane Fuel Cells (HT-PEMFC) uses phosphoric acid (PA) doped poly-benzimidazole (PBI) as proton conducting membrane. These PBI based membrane electrode assembly (MEA) works even at a temperature higher than 150° C. but performance degradation of these MEAs during long term operation is a major concern and many efforts are being carried out to solve this issue. Due to this reason more research work is being focused on the electrocatalyst. The electrode as well as PA leaching from the PBI membrane during fuel cell operation, is a major concern in overall degradation of fuel cell performance.

PA is the major proton conducting source in the PBI based membranes and thus leaching of PA affects the overall performance of the MEA's. Many composite membranes have been introduced in order to improve the proton conductivity but the leaching of PA during fuel cell operation is still a pertaining issue. The formation of water vapor during fuel cell reaction on the electrode can be easily absorbed by the PA in the membrane which leads to the leaching of PA from the membrane.

Kim et. al describes the efficient formation of triple phase boundary by the incorporation of an ionomer in the catalyst layer in a modified manner. The cathode and anode are prepared by casting slurry including a catalyst and an ionomer on a gas diffusion layer, and drying the resulting layer to form a catalyst layer. The ionomer was dissolved in NMP and the Pt/C catalyst was mixed separately in NMP. After that, the two solutions were mixed well and added to a second solvent (Hexane or water) for phase separation and the ionomer film is chemically adsorbed onto the catalyst surface. This will leads to the effective covering of Pt/C by ionomer, rather than the normal method. This gives an enhanced fuel cell performance compared to electrodes made by the conventional method. (US 2006/0105226 A1, May 18, 2006)

The method comprises mixing the conductive catalyst material, the proton conductive material, and a first solvent and casting the obtained mixture onto a supporting layer. The mixture is dried to form a conductive catalyst containing film and the conductive catalyst containing film is separated from the supporting layer and pulverized. According to this invention, the ionomer percentage in compared to the conductive catalyst material is in the range of 1-50%, The ratio above or below this range would leads to a low fuel cell performance. The invention also mention about the temperature range for drying the catalyst layer after coating. The suitable temperature is 60-150° C., below 60° C. the coating would not dried well and above 150° C. the carbon support will get oxidize. (U.S. Pat. No. 8,039,414 B2, Oct. 18, 2011)

Liu et. al studied the membrane electrode assemblies in a fuel cell. They produced electrode with a good performance. In their electrode, the binder may comprise at least one triazole modified polymer which is configured to ensure that the catalyst contacts the surface of the electrolyte membrane. Here, the triazole group acts as the proton conduction path and this is effective above the boiling point of water. (U.S. Pat. No. 7,947,410 B2, May 24, 2011).

Li et. al studied the water uptake of PBI and acid doped PBI membranes. It tells that at a low acid doping percentage, the water uptake by membrane was less as the active sites of the imidazole ring was occupied with doped acid molecules. Whereas at higher acid doping level the percentage of water uptake is higher than that of nation membrane and is due to the hygroscopic nature of the acid doped with the membrane. This work also tells about the doping time required for PBI membrane and about 50 hrs is needed for doping the PBI membrane at room temperature. This work also mentioning that at higher acid doping level, the excess acid would contributing fir conductivity and also it suffer from the leaching out when sufficient liquid was present on the membrane. (Solid State Ionics 168 (2004) 177-185)

He et. al studied the conductivity of phosphoric acid doped PBI membrane with temperature, acid doping level and relative humidity. This work is also deals with the PBI composite membranes such as PBI with inorganic proton conducting materials like zirconium phosphate, phosphotungstic acid and silicotungstic acid. The conductivity of these composite membranes also studied with various parameter and obtain higher conductivity for PBI composite containing zirconium phosphate at 200° C. and 5% RH. (Journal of Membrane Science 226 (2001) 169-184)

Seland et. al studied the optimum anode and cathode composition by varying the Pt content in Pt/C and also the catalyst loading. He found that a high platinum content and a thin catalyst layer on both anode and cathode, gave the overall best performance. This was attributed to the different catalyst surface areas, the location of the catalyst in relation to the electrolyte membrane and particularly the amount of PBI dispersed in the catalyst layer. (Journal of Power Sources 160 (2006) 27-36)

Hence, a practical solution to surmount this issue to achieve successful penetration of PA-PEMFCs for commercial applications is necessary.

OBJECTIVE OF THE INVENTION

The main object of the present invention is to provide a process for the preparation of poly-benzimidazole (PBI) based membrane electrode assembly (MEA) with improved fuel cell performance and stability.

Another object of the present invention is to provide a simple strategy to overcome the leaching of PA from the membrane during fuel cell operation by an in-situ Current-Voltage (I-V) assisted doping of membrane with PA.

Another object of the present invention is to provide an improved method for the preparation of membrane electrode assembly (MEA) with high stability and improved fuel cell performance achieved by overcoming the leaching of phosphoric acid during cell operation.

SUMMARY OF THE INVENTION

Accordingly, the present invention provides a method for the preparation of Membrane Electrode Assembly (MEA) for high temperature fuel cell with improved fuel cell perform an cc comprising:
  a. coating of 80-85% phosphoric acid (H3PO4) on anode and cathode electrode surfaces to obtain coated electrodes;
  b. keeping H3PO4 doped poly-benzimidazole (PBI) membrane in thickness ranging between 50-60 μm between the two electrodes of step (a) to obtain an assembly; and
  c. hot pressing the assembly of step (b) to obtain the MEA.

In an embodiment of the present invention, the phosphoric acid doped to PBI in step (b) is in the ratio of 9-11 moles per repeating unit.

In one embodiment of the present invention, coating of 1-2 ml $H_3PO_4$ is carried out on the surface of anode and cathode electrode.

In another embodiment of the present invention, anode and cathode electrode are 40% Pt/C with a Pt loading of 1 mg/cm$^2$ on each electrode.

Still in another embodiment of the present invention a Membrane electrode assembly (MEA) comprising;
  a. gas diffusion anode and cathode electrodes coated with 1-2 ml of 85% phosphoric acid;
  b. polymer electrolyte membrane comprising of phosphoric acid doped PBI as solid electrolyte in thickness in the range of 50-60 μm as well as the membrane; and
  c. Optionally comprises additives selected from zirconia, silica, porous graphene and nano-horns.

Still in another embodiment of the present invention the membrane electrode assembly (MEA) is use in the preparation of fuel cell testing station by maintaining the MEA system under controlled current (I)-voltage (V) conditions in order to generate a controlled amount of water and to mobilize electro-osmotic drag within the system wherein the leaching of phosphoric acid is reduced by an in-situ Current-Voltage (I-V) assisted doping of membrane with phosphoric acid for high temperature fuel cell.

Still in another embodiment of the present invention, fuel cell testing station, optionally comprising additives selected from the group consisting of zirconia, silica, porous graphene and nano-horns, said additives are capable of holding the coated H3PO4 molecules and releasing the acid in a much more controlled way during the cell operation condition to improve the fuel cell performance.

LIST OF ABBREVIATIONS

HT-PEMFC: High Temperature Polymer Electrolyte Membrane Fuel Cells.
MEA: Membrane Electrode Assembly.
PA: Phosphoric Acid.
PBI: Poly-benzimidazole.

DETAILED DESCRIPTION OF THE INVENTION

Figure 1:
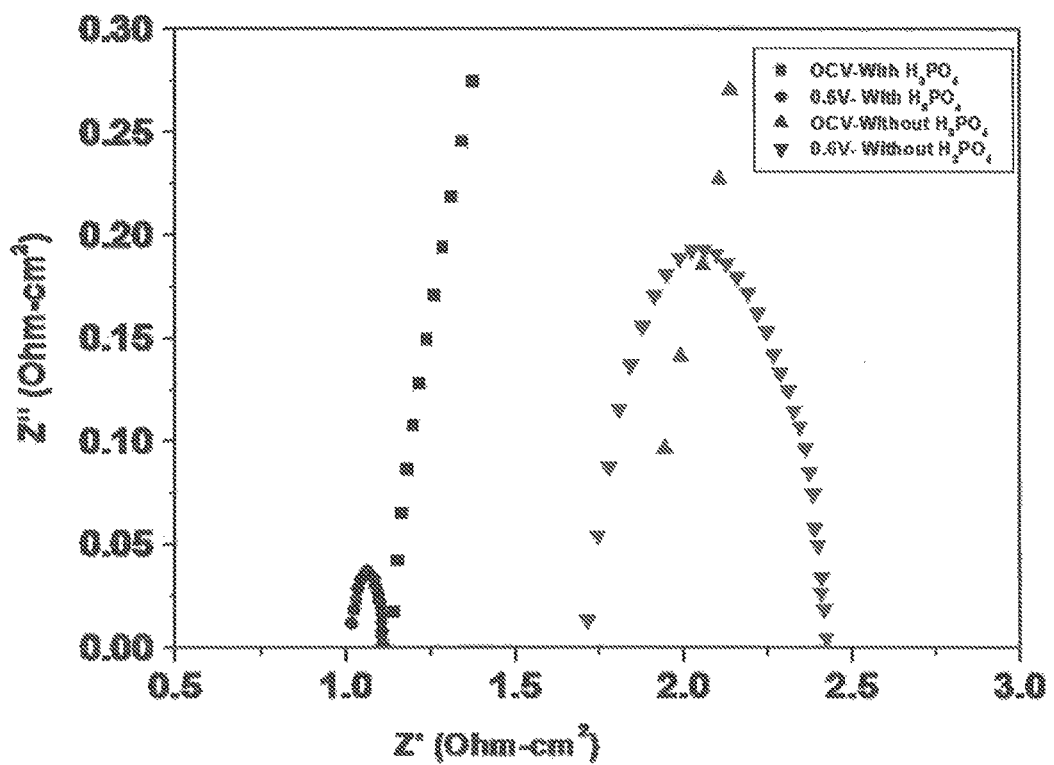
FIG. 1: Impedance spectra of MEAs with and without phosphoric acid coating.

The present invention relates to a simple strategy to overcome the leaching of PA from the membrane during fuel cell operation by an in-situ Current-Voltage (I-V) assisted doping of membrane with PA.

The present invention relates to an improved method for devising membrane electrode assembly (MEA) which improves the fuel cell performance by overcoming the leaching of phosphoric acid during cell operation. The in-situ doping creates an efficient electrode-electrolyte interfaces thereby reducing the charge transfer resistance in the electrode and decreases the resistance for proton conduction which significantly improves the cell performance.

The most preferred polymer membrane is selected from poly 2,2'-(m-phenylene)-5,5'-bibenzimidazole product, PBI. Said polybenzimidazole is an amorphous thermoplastic polymer with a glass transition temperature of 425-436° C. The PBI membrane is doped with 85% $H_3PO_4$ for 3 hrs at 100° C.

A further aspect of the invention relates to a solid electrolyte for polymer electrolyte membrane fuel cell (PEMFC), said solid electrolyte comprises PBI doped with phosphoric acid (85%).

In an aspect, the present invention relates to a method for the fabrication of Membrane Electrode Assembly (MEA) for high temperature fuel cell, wherein said MEA provides improved fuel cell performance by overcoming the leaching of phosphoric acid during cell operation, comprising the steps of;
  1. coating a definite amount (1 mL) of H3PO4 (85 wt %) on anode and cathode electrode (Pt catalyst (1 mg/cm$^2$) coated on gas diffusion layer) surfaces to obtain coated electrodes;
  2. keeping $H_3PO_4$ doped PBI membrane between the two electrodes of step (1) to obtain an assembly; and
  3. hot pressing the assembly of step (2) to obtain the desired MEA, In a preferred aspect of the invention, the leaching of phosphoric acid (PA) from the membrane during fuel cell operation is reduced by an in-situ Current-Voltage (I-V) assisted doping of membrane with PA.

Preparation of Gas Diffusion Electrodes

The anode and cathode electrode gas diffusion electrode comprises of 40% Pt/C with a Pt loading of 1 mg/cm$^2$ each and an N/C (Ionomer to carbon) ratio of 0.4

The gas diffusion cathode is normally used for reducing an oxygen-containing oxidant gas and the gas diffusion anode is used for oxidizing a fuel gas, in particular a hydrogen-rich fuel gas. In a preferred polymer electrolyte membrane, the anode and cathode preferably comprises a Pt catalyst.

The catalysts for use in the polymer electrolyte membranes of the present invention are selected from noble metals of Group VIII of the periodic table, particularly platinum (Pt), ruthenium (Ru), alloys of Pt—Ru, etc. The catalysts are typically used as metal-carbon particles carrying the catalyst.

In the preparation of electrodes, Pt/C catalyst is coated/loaded on a Gas Diffusion layer (GDL) by conventional brush coating method using nation as a binder and isopropyl alcohol as the solvent. After brush coating on the surface of the GDL with Pt/C catalyst, it is dried at 125° C. The electrode is taken in a square shape with an area of 9 cm$^2$ to 45 cm$^2$. The platinum loading is about 1 mg/cm$^2$.

In another preferred aspect of the invention, the electrodes are further coated with phosphoric acid (85%) with an amount 1 ml. The coated electrodes so obtained is ready fir assembling.

The membrane electrode assembling is then carried out by sandwiching the phosphoric acid doped PBI membrane between the acid coated anode and electrode and hot pressing the assembly at a temperature in the range of 125-135° C. by applying 0.5-1 ton pressure for 10-25 minutes.

The polymer electrolyte membrane has a thickness of 55 μm and MEA thickness primarily depend on the catalyst loading, catalyst ratio and pressure.

The Membrane electrode assembly (MEA) fabricated by the method of present invention comprises:
1. Gas diffusion anode and cathode electrodes coated with phosphoric acid; and
2. Polymer electrolyte membrane comprising of phosphoric acid doped PBI as solid electrolyte as well as the membrane and
3. Gaskets with a thickness of 210 μm kept on both sides of the MEA to prevent the gas leakage.

In a preferred embodiment, the parameters for the preparation of MEA are as shown below in table 1:

TABLE 1

| MEA preparation parameters | |
| --- | --- |
| Membrane | Fumatec PBIAP |
| Catalyst | 40 wt % Pt/C |
| Binder | Nafion |
| Area | 9 cm$^2$-45 cm$^2$ |
| Pt Loading | 1 mg/cm$^2$ |
| Hot pressing time | 10-24 minutes |
| Temperature for hot pressing | 130° C. |
| Pressure applying | 0.5-1 ton |

In another aspect the present invention provides a method for the preparation of Fuel cell testing station comprising:
a. coating thin layer of PA on electrodes (anode and cathode) which directing towards PA doped membrane followed by MEA preparation;
b. Maintaining the MEA system of step (a) under controlled current (I)-voltage (V) conditions in order to generate a controlled amount of water and to mobilize electro-osmotic drag within the system.

Figure 2:
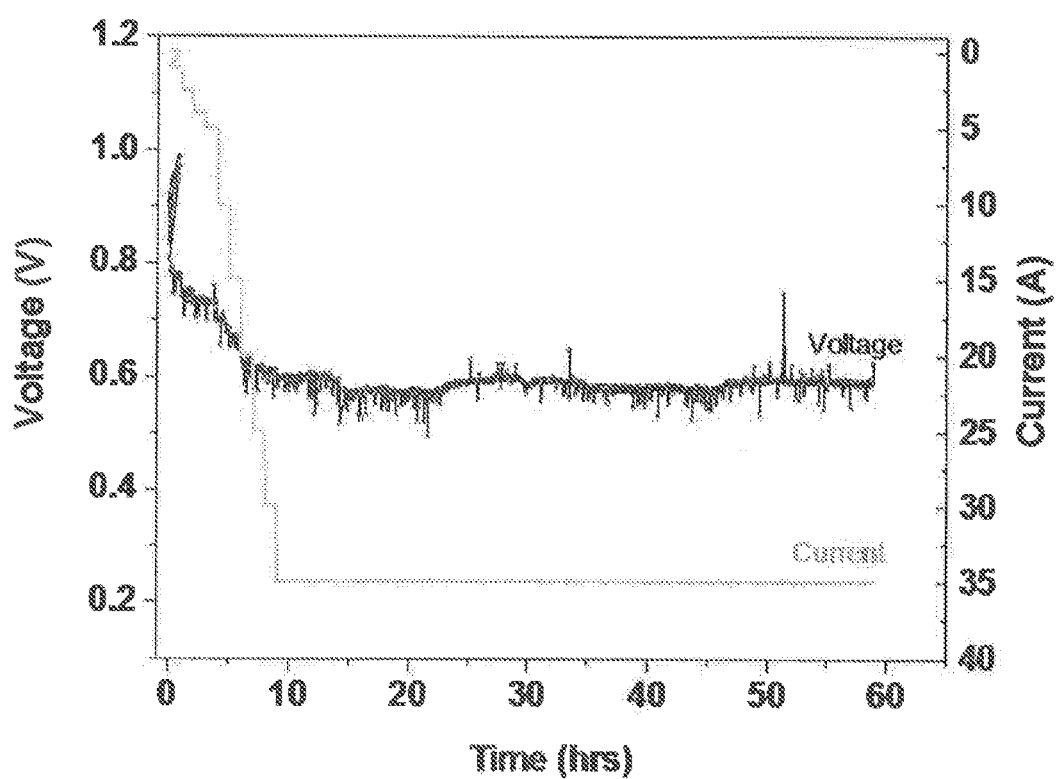
FIG. 2: Conditioning of the MEA with H3PO4 coating.
Figure 4:
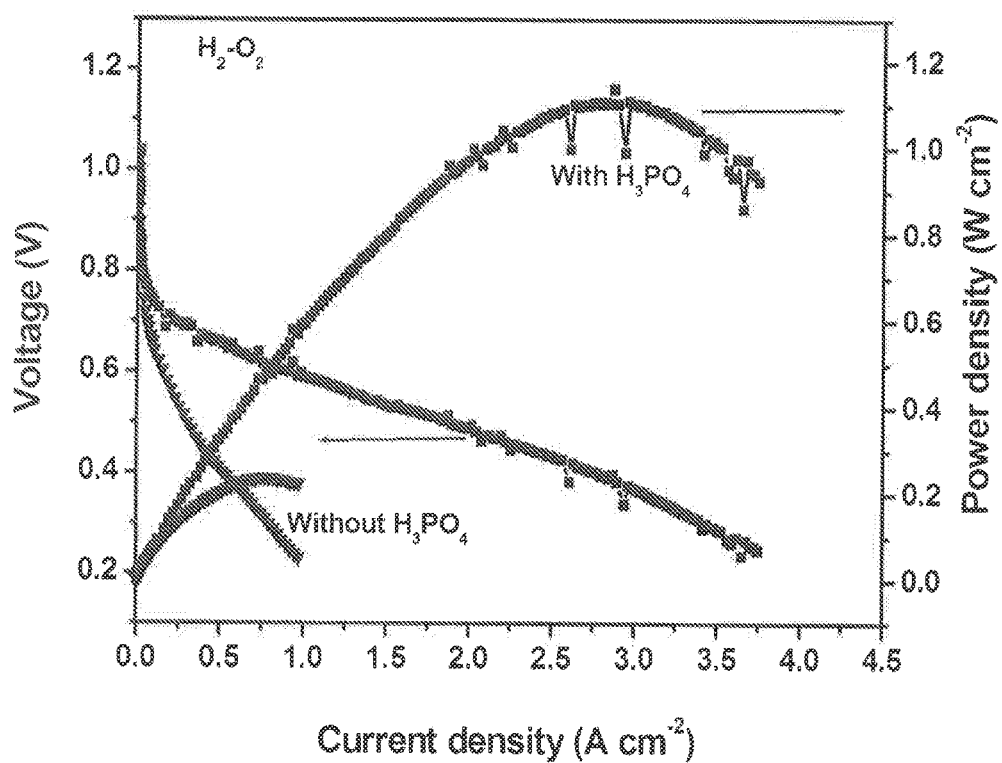
FIG. 4: Polarization plot of MEAs with and without $H_3PO_4$ in $H_2$ and oxygen.
Figure 5:
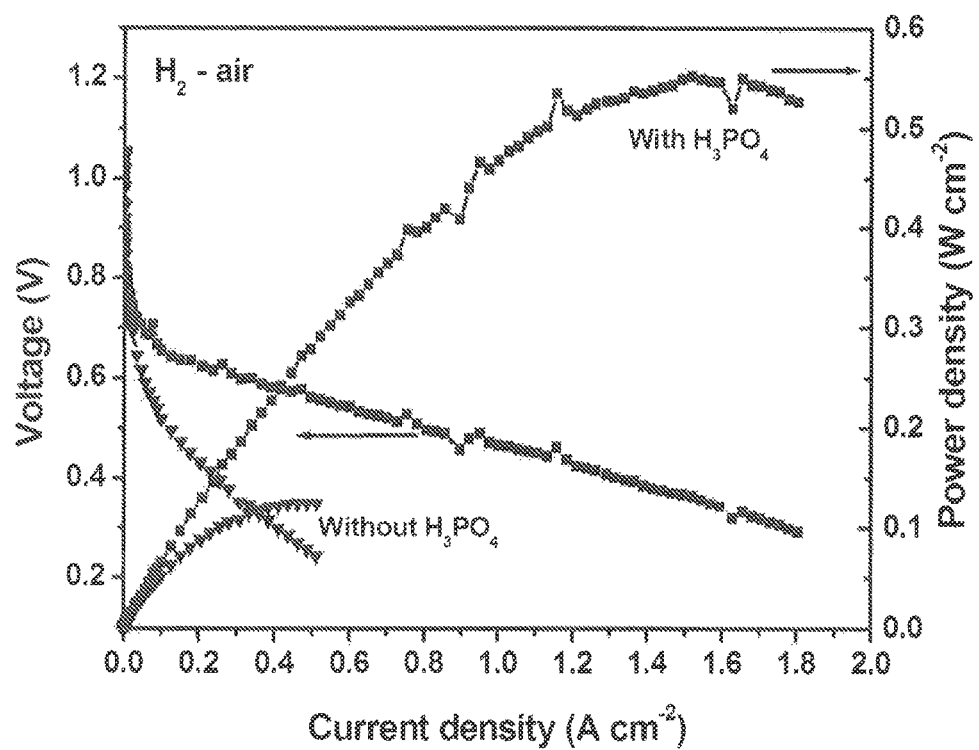
FIG. 5: Polarization plot of MEAs with and without $H_3PO_4$ in $H_2$ and air.
Figure 6:
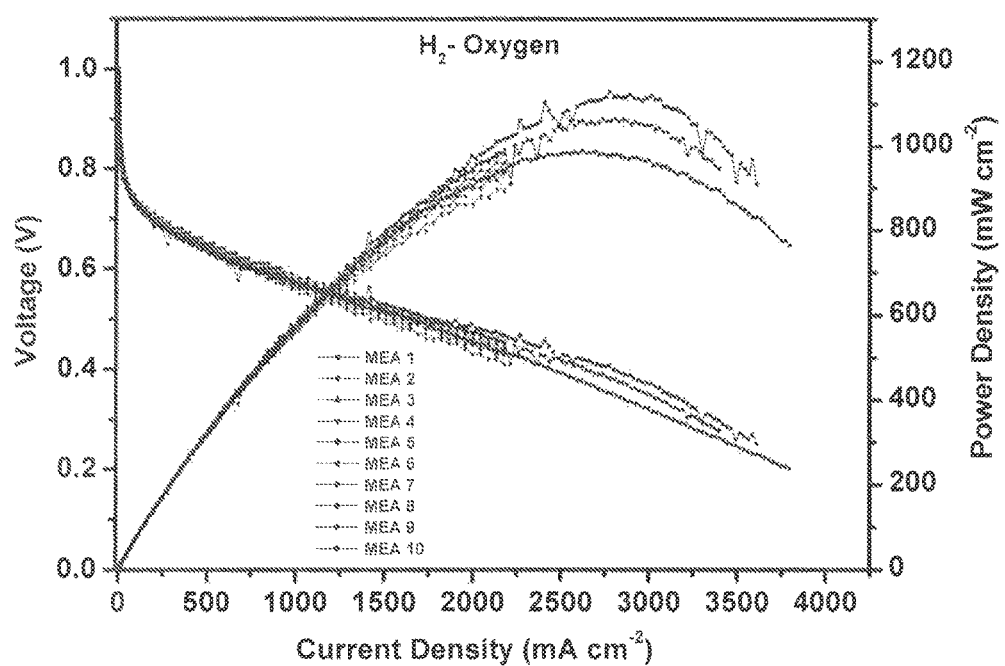
FIG. 6: Polarization plot of MEAs in $H_2$ and oxygen.
Figure 7:
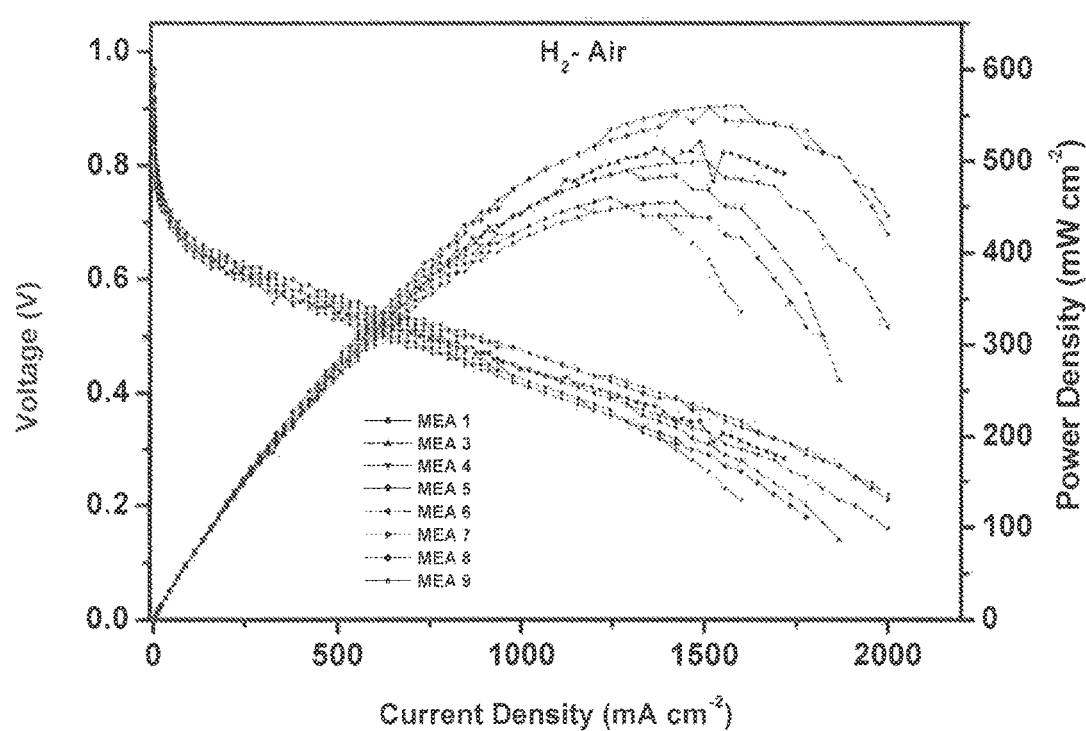
FIG. 7: Polarization plot of MEAs in $H_2$ and air
Figure 8:
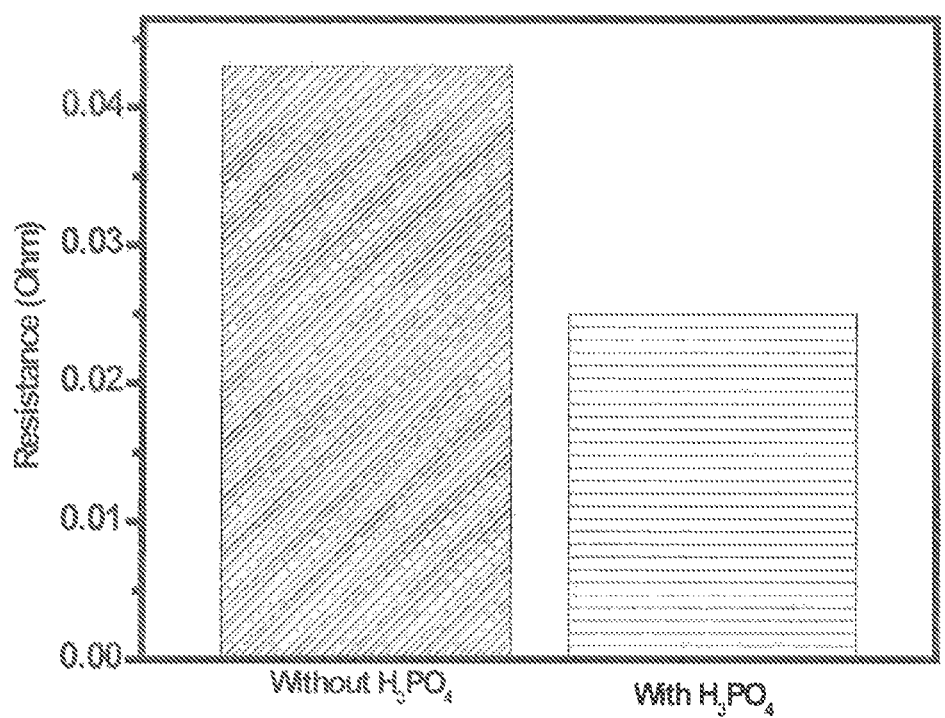
FIG. 8: Bar diagram showing the resistance values of with and without in-situ $H_3PO_4$ doped MEAs with an active area of 45 cm$^2$ as measured from the EIS studies
Figure 9:
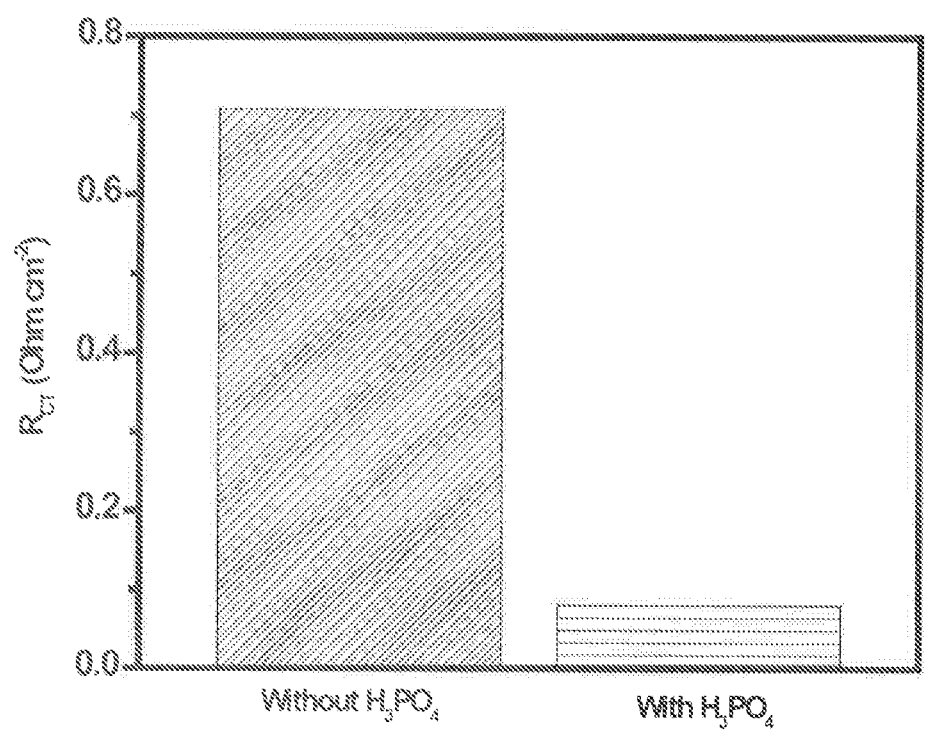
FIG. 9: Bar diagram showing the charge transfer resistance values of the MEAs with and without PA coating measured from the EIS studies (Area of the electrode is 45 cm$^2$)

MEA fabricated with in-situ doping technique, both proton conductivity of the membrane as well as $R_{CT}$ is improved compared to the MEA derived from without in-situ doping process. About 2 fold decrement in the resistance for proton conduction through the membrane and 10 fold decrement in charge transfer resistance are observed for the MEA fabricated though in-situ doping technique (FIGS. 1 and 2, Table 1A). These reduced resistances reflect significantly in the single cell performance as shown in FIGS. 4 and 5 and Table 1A.

TABLE 1A

Electrochemical data showing the properties of different MEAs with active area of 45 cm$^2$ under H$_2$—O$_2$ feed conditions.

| Sl. No | MEA | Resistance (ohm) | RCT (ohm cm$^2$) | Current Density @ 0.6 V (A cm$^{-2}$) | Maximum Power Density (W cm$^{-2}$) |
| --- | --- | --- | --- | --- | --- |
| 1 | Without H$_3$PO$_4$ coated (No in-situ doping) | 0.043 | 0.708 | 0.177 | 0.236 |
| 2 | With H$_3$PO$_4$ coated (In-situ doping) | 0.025 | 0.081 | 0.912 | 1.108 |

In a preferred aspect, the present invention provides the fuel cell performance data of MEAs (with and without in-situ doped PA) as shown below in Table 2:

TABLE 2

Fuel cell performance of MEAs with and without H$_3$PO$_4$

| | MEAs with H$_3$PO$_4$ coated electrodes | | MEAs without H$_3$PO$_4$ coated electrodes | |
| --- | --- | --- | --- | --- |
| | Oxygen | Air | Oxygen | Air |
| Maximum Power Density | 1.108 W/cm$^2$ | 0.549 W/cm$^2$ | 0.236 W/cm$^2$ | 0.124 W/cm$^2$ |
| Current Density at 0.6 V | 0.912 A/cm$^2$ | 0.338 A/cm$^2$ | 0.177 A/cm$^2$ | 0.055 A/cm$^2$ |

To further analyze the reproducibility of the PA (phosphoric acid) coated electrode based MEA (membrane electrode assembly), polarization of ten different MEAs with an active area of 45 cm$^{-2}$ and Pt loading of 1 mg cm$^{-2}$ was conducted on both the anode and cathode. Polarization was carried out in both oxygen and air as oxidant and hydrogen as fuel. No noticeable difference was observed in power density and current density at 0.6 V of these 10 MEAs (All the 10 MEAs were made by using the same protocol as mentioned for the previous PA coated MEAs) when oxygen and air was used as oxidant (table 3 and 4). Thus the instant modified method for the fabrication of MEA for high temperature PEM fuel cells is highly reproducible.

TABLE 3

Current density and power density of MEAs at 0.6 V in H2 and oxygen

| Experiment | Open circuit voltages (V) | Current density @ 0.6 V (A cm$^{-2}$) | Power density @ 0.6 V (W cm$^{-2}$) |
| --- | --- | --- | --- |
| MEA 1. | 0.97 | 0.82 | 0.488 |
| MEA 2 | 0.99 | 0.80 | 0.476 |
| MEA 3 | 0.95 | 0.866 | 0.520 |
| MEA 4 | 0.96 | 0.777 | 0.458 |
| MEA 5 | 0.99 | 0.911 | 0.546 |
| MEA 6 | 1.00 | 0.866 | 0.520 |
| MEA 7 | 0.84 | 0.778 | 0.458 |
| MEA 8 | 0.98 | 0.80 | 0.480 |
| MEA 9 | 0.98 | 0.80 | 0.472 |
| MEA 10 | 0.98 | 0.799 | 0.473 |

TABLE 4

Current density and power density of MEAs at 0.6 V in H2 and air.

| Experiment | OCV (V) | Current density @ 0.6 V (A cm$^{-2}$) | Power density @ 0.6 V (W cm$^{-2}$) |
|---|---|---|---|
| MEA 1. | 0.94 | 0.270 | 0.165 |
| MEA 2 | — | — | — |
| MEA 3 | 0.90 | 0.311 | 0.186 |
| MEA 4 | 0.91 | 0.311 | 0.186 |
| MEA 5 | 0.97 | 0.377 | 0.226 |
| MEA 6 | 0.97 | 0.376 | 0.226 |
| MEA 7 | 0.78 | 0.244 | 0.146 |
| MEA 8 | 0.92 | 0.266 | 0.160 |
| MEA 9 | 0.96 | 0.311 | 0.186 |
| MEA 10 | — | — | — |

Invention discloses a simple strategy to overcome the leaching of PA from the membrane during fuel cell operation by an in-situ Current-Voltage (I-V) assisted doping of membrane with PA. This method proved to be a better MEA developing strategy for improved fuel cell performance with high stability.

This method comprises, thin layer coating of PA on electrodes (anode and cathode) which directing towards PA doped membrane followed by MEA preparation. The system will be maintained under controlled current (I)-voltage (V) conditions in order to generate a controlled amount of water and hence to mobilize electro-osmotic drag within the system.

During the fuel cell operation conditioning under controlled conditions, the water which is producing on the electrode assists re-doping of PA from the electrode surface to membrane. The water current also helps doping of phosphoric acid into the electrodes to maintain effective triple-phase boundary with Pt catalyst.

This re-doping technique during fuel cell operation maintains the PA content in the membrane hence preventing PA leaching issue. Cell operation temperature (160° C.) also boosts I-V assisted PA re-doping. Compared to normal PA doped PBI based MEA, In-situ re-doping of PBI membrane provides High proton conductivity
Low electrode charge transfer resistance
High fuel cell performance
Improved stability of cell performance Most importantly, I-V assisted In-situ doping process is very simple and easily processable.

The key features of the invention is the in situ doping. None of the prior art discusses this mechanism which results in enhanced efficiency. Attached table comparing the normal doping and in-situ doping gives clear proof of improved stability, performance substantiating the inventive step involved.

In another aspect the present invention provides a method for the preparation of Fuel cell testing station wherein the cell performance can be farther improved by adding materials like Zirconia, Silica for holding the coated $H_3PO_4$ molecules and releasing the acid in a much more controlled way during the cell operation condition.

In yet another aspect the present invention provides a method for the preparation of Fuel cell testing station wherein the cell performance can be further improved by adding materials with high porosity such as porous graphene and nano-horns can also be used as phosphoric acid holding materials in high temperature $H_3PO_4$ doped PBI based PEMFCs.

The following examples are given by way of illustration of the working if the invention is actual practice and shall not be construed to limit the scope of the present invention in anyway.

EXAMPLES

Example 1

Experimental Details:
Preparation of $H_3PO_4$ Doped Membrane

The Pt/C (40% Pt/C with a Pt loading of 1 mg/cm$^2$ each on anode and cathode) catalyst was coated on a Gas Diffusion layer (GDL) by conventional brush coating method using Nafion as a binder and Iso-propyl alcohol as the solvent. After brush coating on the surface of the GDL with Pt/C catalyst, it dried at 125° C., in an oven for overnight (15 hrs). The Electrode was taken in a square shape with an area of 45 cm$^2$.

The PBI membrane was doped with 85% $H_3PO_4$ acid at 100° C. for 3 hrs.

Coating of Electrodes:
Thin layer coating of $H_3PO_4$ (1 ml) on the surfaces of electrodes (anode and cathode) is done to obtain coated electrodes.

Preparation of Membrane Electrode Assembly (MEAs):
1) coating an amount (1 mL) of $H_3PO_4$ (85 wt %) on anode and cathode electrode surfaces;
2) keeping the H3PO4 doped PBI membrane (55 μm thickness) between those two electrode;
3) hot pressing these assembly at 130° C. by applying 0.5-1 ton for 15 minutes.

The MEA making protocol is shown below in table 5.

TABLE 5

MEA preparation parameters

| | MEAs with and without $H_3PO_4$ Coated electrodes |
|---|---|
| Membrane | Fumatec PBIAP |
| Catalyst | 40 wt % Pt/C |
| Binder | Nafion |
| Area | 45 cm$^2$ |
| Pt Loading | 1 mg/cm$^2$ |
| Hot pressing time | 10 minutes |
| Temperature for hot pressing | 130° C. |
| Pressure applying | 1 ton |

Fuel Cell Test Station:

The MEA is fixed in a fuel cell fixture using gaskets for preventing gas leakage within the fixture. The fixture is then connected to the fuel cell test station and H2 through anode and $O_2$/Air through cathode is purged using a flow rate of 0.1 slpm on each side.

During fuel cell testing, the fixture was continuously heated using an outside temperature controller connected to the fixture. The cell was kept in Open Circuit Voltage (OCV) condition for 50 minute and as the fixture reaches to 120° C., a definite amount of current 1 Ampere was dragged and kept for a time interval. A definite amount 5 Ampere of current was dragged periodically and the current dragging process was stopped as the cell voltage reaches to 0.6V. The cell was kept at this voltage for a time period of 2 hours and then the polarization of the cell was measured.

The clear evidence for the in-situ $H_3PO_4$ doping on PBI membrane and the increased fuel cell performance was clarified by the impedance plot (FIG. 1). Here, the real part of the resistance was plotted against imaginary part and is usually called as the Nyquist plot. The Nyquist plot provides both membranes resistance and charge transfer resistance ($R_{CT}$). Both membrane resistance and charge transfer resistance values for $H_3PO_4$ coated MEA is lesser than the MEA without $H_3PO_4$ coating. The $R_{CT}$ values for $H_3PO_4$ coated and without coated MEAs are 0.081 ohm-cm$^2$ and 0.708 ohm-cm$^2$ respectively and the membrane resistance values for with and without $H_3PO_4$ coated MEAs are respectively 0.025 ohm and 0.043 ohm. About tenfold lowering in charge transfer resistance was observed after $H_3PO_4$ coating. The lowering of the membrane resistance and $R_{CT}$ value helps for the higher fuel cell performance in case of $H_3PO_4$ coated MEA.

The FIG. 2 shows the conditioning and the durability test of the MEAs with $H_3PO_4$ coating. The MEA conditioning was carried out by Current-Voltage (IV) conditioning method where different current was dragged at constant interval of time. During current dragging, water was generated within the cell and this water helped for the in-situ $H_3PO_4$ doping on the PBI membrane. More clearly, the water generated during each current drag will move from cathode to anode due to electro-osmotic and concentration gradient. As the water moves from one side to the other, it carries the $H_3PO_4$ molecules and this acid molecule helps in the in-situ doping on the membrane. The cell operating temperature was higher than 100° C. and was also a suitable condition for membrane doping. Due to electro-osmotic drag, water moves from cathode to anode as well. Even after 60 hour of conditioning there was no noticeable difference in current as well as potential. $H_3PO_4$ coated MEA provided 35 A current at 0.6V which is 3.5 times higher than the MEA without $H_3PO_4$ coating (FIG. 3).

Figure 3:
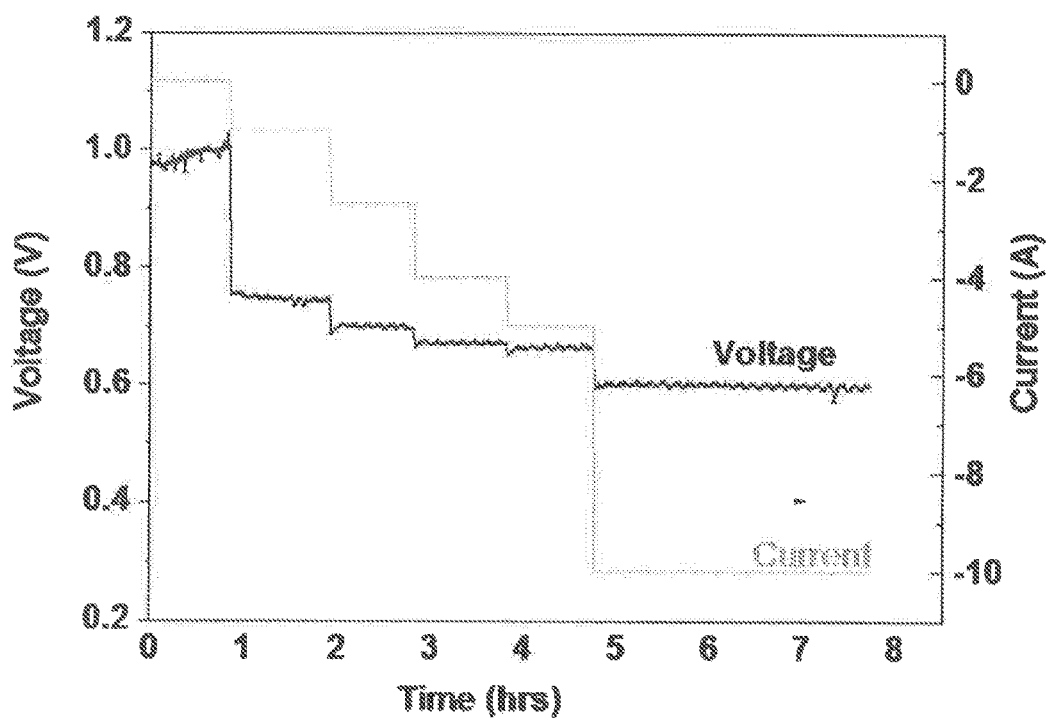
FIG. 3: Conditioning of the MEA without H3PO4 coating.

FIG. 3, shows the conditioning of the MEA without $H_3PO_4$ coating on the electrode surfaces. Here, the system delivered only 10 A current at 0.6V.

The FIG. 4 gives the comparative polarization data of with and without $H_3PO_4$ coated MEAs which were tested by purging $H_2$ and $O_2$ in anode and cathode respectively after conditioning. Around six fold improvement was achieved in $H_3PO_4$ coated MEAs performance. At 0.6V, the current density obtained in this case was 0.912 A/cm$^2$ and the maximum power density was 1.106 W/cm$^2$.

In the case of $H_2$-Air polarization, improved performance was observed in $H_3PO_4$ coated MEA. FIG. 5 shows the comparison polarization of the two MEAs in $H_2$-Air system. The maximum power density obtained with and without $H_3PO_4$ coated MEA were 0.549 W/cm$^2$ and 0.124 W/cm$^2$ respectively. The current densities at 0.6V for with and without $H_3PO_4$ cases are 0.338 A/cm2 and 0.055 A/cm2 respectively as shown below in table 6. So, $H_3PO_4$ coating on the electrode surfaces enhances the cell performances.

TABLE 6

Fuel cell performance of MEAs with and without $H_3PO_4$

| | MEAs with H3PO4 coated electrodes | | MEAs without H3PO4 coated electrodes | |
|---|---|---|---|---|
| | Oxygen | Air | Oxygen | Air |
| Maximum Power Density | 1.108 W/cm$^2$ | 0.549 W/cm$^2$ | 0.236 W/cm$^2$ | 0.124 W/cm$^2$ |

TABLE 6-continued

Fuel cell performance of MEAs with and without $H_3PO_4$

| | MEAs with H3PO4 coated electrodes | | MEAs without H3PO4 coated electrodes | |
|---|---|---|---|---|
| | Oxygen | Air | Oxygen | Air |
| Current Density at 0.6 V | 0.912 A/cm$^2$ | 0.338 A/cm$^2$ | 0.177 A/cm$^2$ | 0.055 A/cm$^2$ |

The cell performance can be further improved by adding materials like Zirconia, Silica etc. for holding the coated $H_3PO_4$ molecules and releasing the acid in a much more controlled way during the cell operation condition. Similarly, materials with high porosity such as porous graphene and nano-horns can also be used as phosphoric acid holding materials in high temperature $H_3PO_4$ doped PBI based PEMFCs.

Advantages of Invention

The salient features of the In-situ doping method as described above are:
a. Maintaining hie PA content in the membrane.
b. Less charge transfer resistance for the electrodes.
c. High proton conductivity for the membrane.
d. High fuel cell performance and improved stability towards fuel cell operation.
e. I-V assisted in-situ doping process is very simple and easily processable.

We claim:
1. A method for the preparation of Membrane Electrode Assembly (MEA) for a high temperature fuel cell comprising:
a. coating of 85 wt % phosphoric acid ($H_3PO_4$) on an anode and a cathode electrode surfaces to obtain coated electrodes;
b. sandwiching an $H_3PO_4$ doped poly-benzimidazole (PBI) membrane having a thickness ranging between 50-60 μm between the two electrodes of step (a) to obtain an assembly;
c. hot pressing the assembly of step (b) to obtain the MEA, and
d. fixing said MEA to a fuel cell fixture,
wherein in-situ current-voltage (I-V) assisted doping of the membrane with phosphoric acid during fuel cell operation reduces the leaching of phosphoric acid from said membrane;
wherein said in-situ current-voltage (I-V) assisted doping comprises:
keeping the cell in open circuit voltage (OCV) for a first time interval of 50 minutes and continuously heating the fixture fixing the fuel cell to a temperature of 120° C.;
dragging a first amount of current for a second time interval; and
periodically dragging a subsequent amount of current until the cell voltage reached 0.6V,
wherein after said cell voltage reaches 0.6 V, the cell is kept at said cell voltage for a time period of 2 hours.
2. The method according to claim 1, comprising providing a coating of 1-2 ml $H_3PO_4$ out on the surface of said anode and said cathode.

* * * * *